Figure 1:
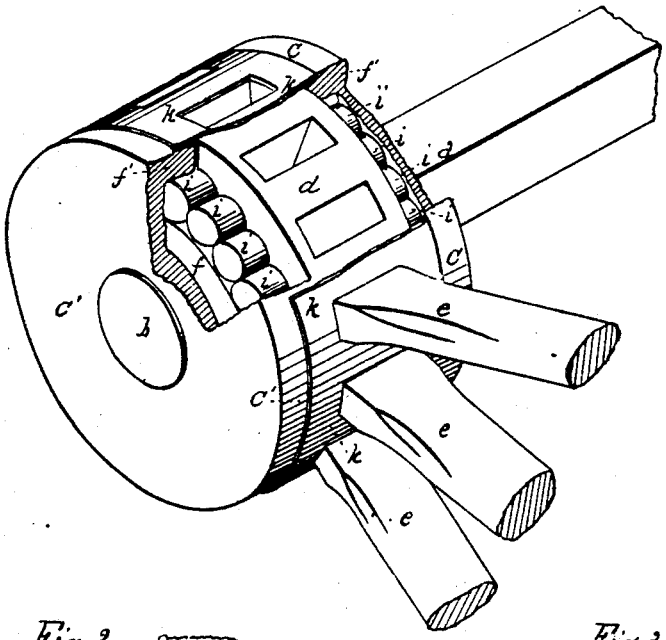
Figure 2:
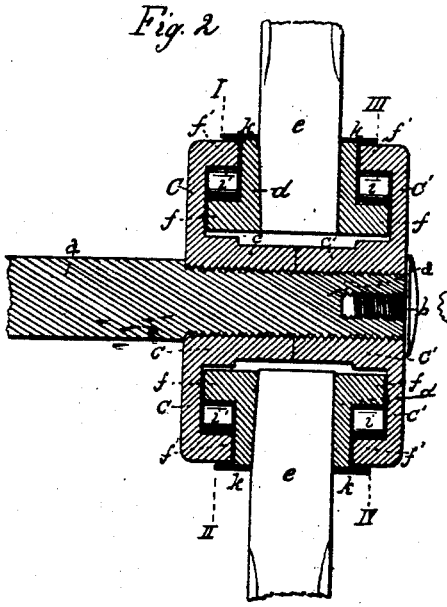
Figure 3:
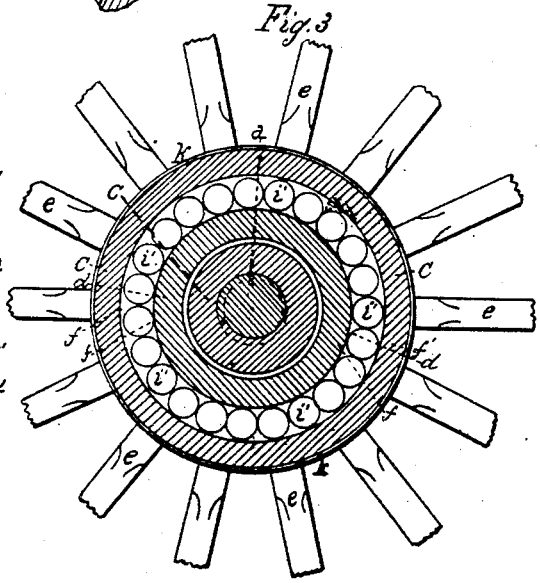

384-389 SUBSTITUTED FOR MISSING COPY Examiner
OR AI 15

A. I. No. 156.

BEST AVAILABLE COPY

PATENTED DEC. 16, 1856.

J. SMITH.

HUB FOR CARRIAGES, &c.